United States Patent
Hu et al.

(10) Patent No.: US 7,426,004 B2
(45) Date of Patent: Sep. 16, 2008

(54) TRANSFLECTIVE PIXEL STRUCTURE HAVING PARTICULAR FLOATING ELECTRODE IN A STORAGE CAPACITOR

(75) Inventors: Chih-Jen Hu, Hsinchu (TW); Chih-Ming Chang, Taoyuan County (TW); Ming-Chou Wu, Nantou County (TW)

(73) Assignee: Au Optronics Corporation, Hsinchu (TW)

( * ) Notice: Subject to any disclaimer, the term of this patent is extended or adjusted under 35 U.S.C. 154(b) by 446 days.

(21) Appl. No.: 11/306,772

(22) Filed: Jan. 11, 2006

(65) Prior Publication Data
US 2007/0019136 A1    Jan. 25, 2007

(30) Foreign Application Priority Data
Jul. 21, 2005   (TW) .............................. 94124658 A

(51) Int. Cl.
G02F 1/1335   (2006.01)
G02F 1/1343   (2006.01)
(52) U.S. Cl. .................... 349/114; 349/38; 349/139
(58) Field of Classification Search ................ 349/114, 349/38, 138, 139
See application file for complete search history.

(56) References Cited
U.S. PATENT DOCUMENTS

| | | | |
|---|---|---|---|
| 6,466,280 B1 | 10/2002 | Park et al. ..................... 349/43 |
| 6,642,979 B2 | 11/2003 | Choo et al. .................. 349/113 |
| 6,646,704 B2 | 11/2003 | Liebscher .................... 349/138 |
| 6,649,992 B2 | 11/2003 | Lim ............................. 257/435 |
| 6,717,632 B2 | 4/2004 | Ha et al. ........................ 349/43 |
| 6,771,334 B2 | 8/2004 | Kubota et al. ............... 349/106 |
| 6,819,385 B2 * | 11/2004 | Lu ............................... 349/144 |
| 7,248,235 B2 * | 7/2007 | Fujii et al. ..................... 345/76 |
| 2003/0020846 A1 * | 1/2003 | Smith et al. ................... 349/43 |
| 2003/0202139 A1 * | 10/2003 | Choi et al. .................. 349/113 |
| 2004/0085498 A1 | 5/2004 | Chang .......................... 349/114 |
| 2004/0212294 A1 | 10/2004 | Oda et al. .................... 313/498 |
| 2006/0279670 A1 * | 12/2006 | Tung et al. ..................... 349/56 |

* cited by examiner

Primary Examiner—Mike Qi
(74) Attorney, Agent, or Firm—Jianq Chyun IP Office

(57) ABSTRACT

A transflective pixel structure is provided. The transflective pixel structure includes an active device, a storage capacitor, a transparent electrode, and a first reflective electrode. The storage capacitor includes a bottom electrode, a floating electrode, and an upper electrode. The upper electrode is disposed above the bottom electrode and the floating electrode and electrically connected to the active device. The transparent electrode is electrically connected to the upper electrode. The first reflective electrode is electrically connected to the floating electrode and electrically insulated from the transparent electrode. As mentioned above, the transflective pixel structure can improve the image quality of a transflective liquid crystal display panel with single cell gap.

11 Claims, 14 Drawing Sheets

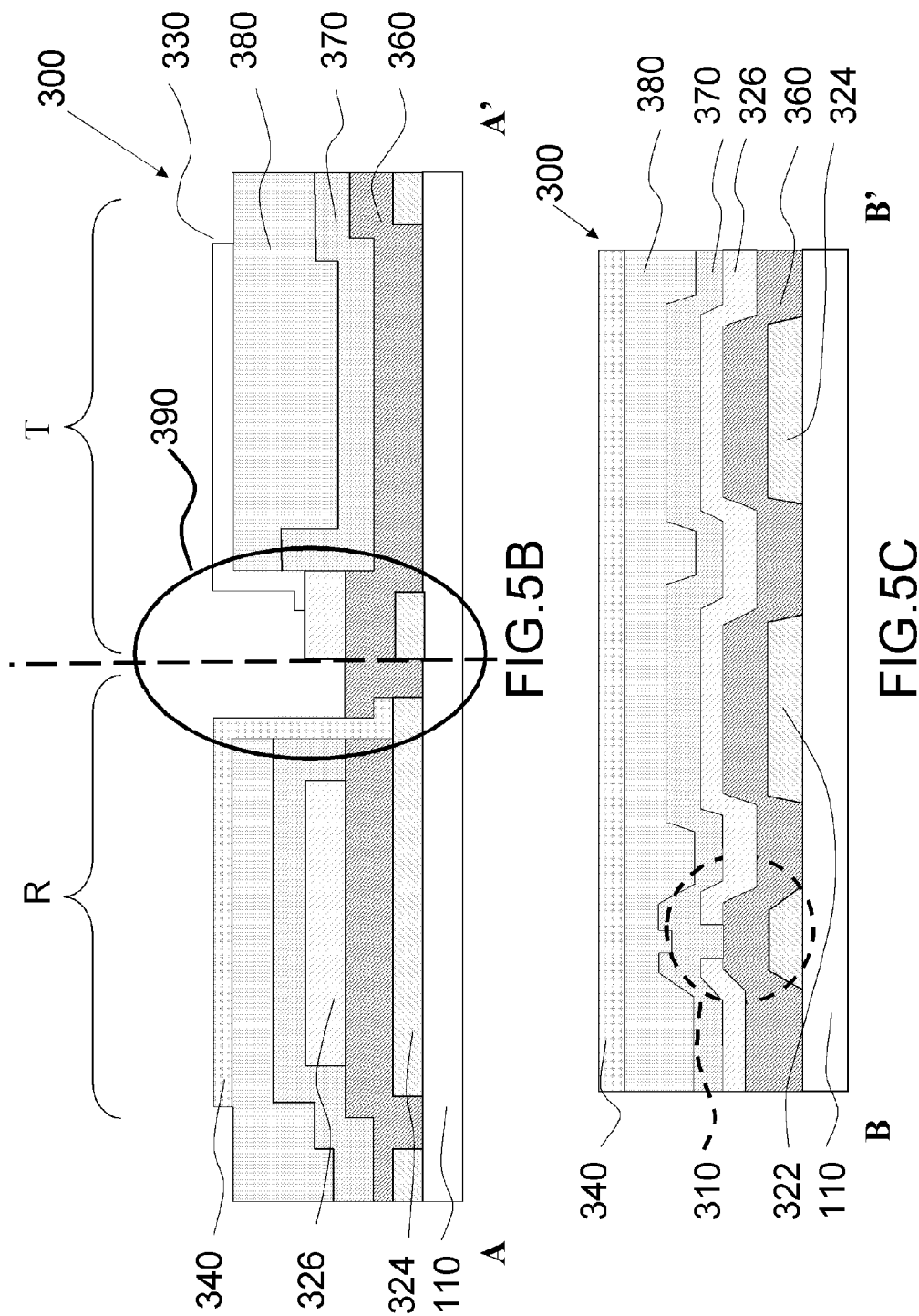

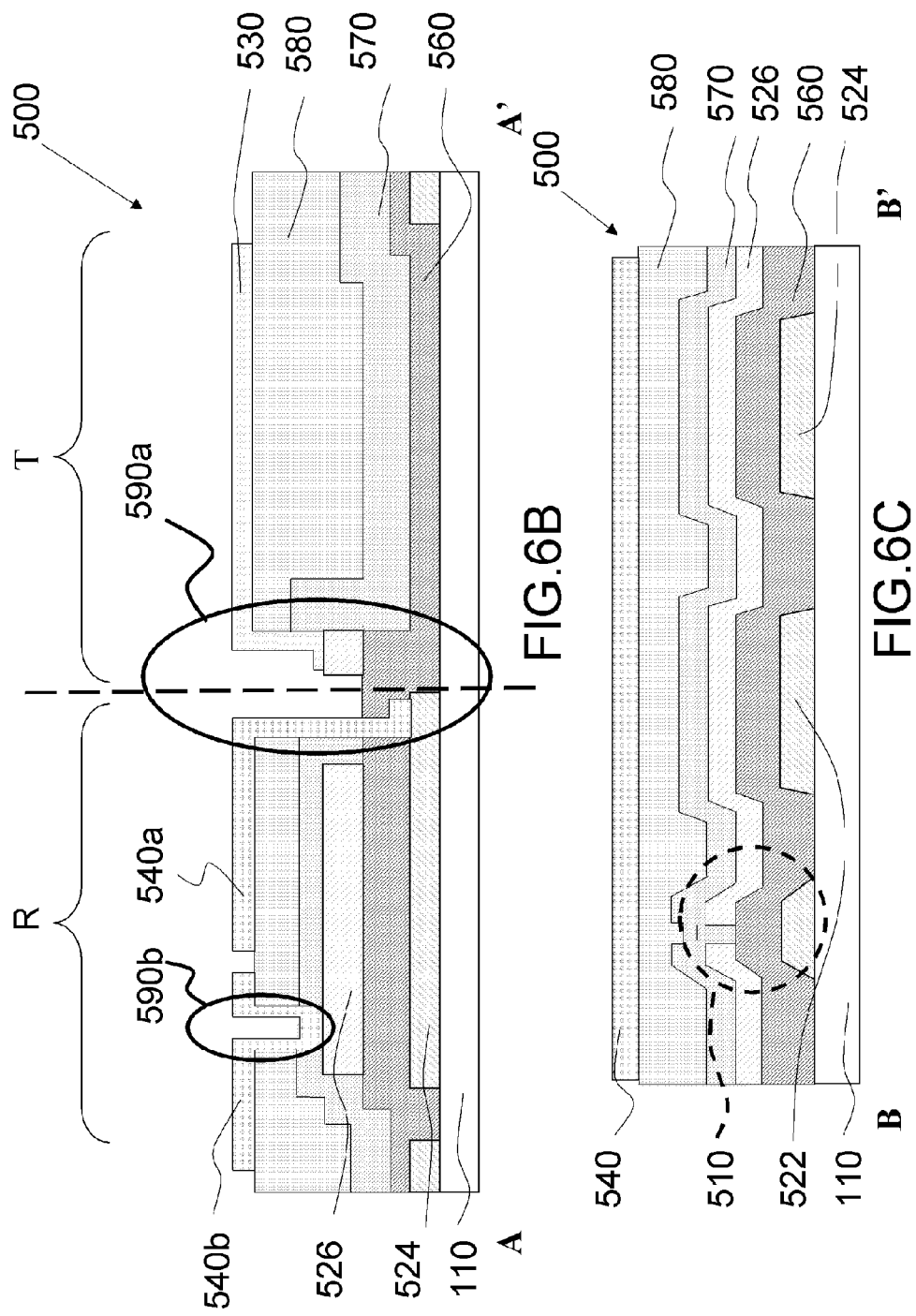

TRANSFLECTIVE PIXEL STRUCTURE HAVING PARTICULAR FLOATING ELECTRODE IN A STORAGE CAPACITOR

CROSS-REFERENCE TO RELATED APPLICATION

This application claims the priority benefit of Taiwan application serial no. 94124658, filed on Jul. 21, 2005. All disclosure of the Taiwan application is incorporated herein by reference.

BACKGROUND OF THE INVENTION

1. Field of Invention

The present invention relates to a transflective pixel structure. More particularly, the present invention relates to a transflective pixel structure capable of improving image quality.

2. Description of Related Art

The rapid advancement of the multimedia society mostly benefits from the rapid progress of semiconductors and display apparatuses. As to the displays, cathode ray tube (CRT) has been leading the display market because of its outstanding performance and cost-saving characteristic. However, in the environment wherein individuals operate most terminals/display apparatuses at their desks, or from the point of view of environmentalism, if estimated with the energy-saving trend, the cathode ray tubes still have many problems in space-using and energy consumption, and cannot provide solutions for the requirements of lighter, slimmer, smaller, and energy-saving devices. Thus, thin-film transistor liquid crystal displays (TFT-LCD) having characteristics of high resolution, space-saving, low power consumption, low radiation etc have become the mainstream of display market gradually.

Generally, liquid crystal displays may be classfied into transmissive LCDs, reflective LCDs, and transflective LCDs according to their differences in light sources usage and array substrate. The transmissive LCDs use mainly back light as light sources, and the pixel electrodes on the array substrates of the transmissive LCDs are transparent which allows the back light to penetrate; the reflective LCDs use mainly front light or external light as light sources, and the pixel electrodes on the array substrates of the reflective LCDs are electrodes made from metal or other materials with excellent reflective characteristic which may reflect front light or external light efficiently; and the transflective LCDs may use both back light and external light as light sources, the pixels thereon can be divided into transmissive area and reflective area, the transmissive area has transparent electrodes which allows the back light to penetrate, and the reflective area has reflective electrodes which can reflect external light.

FIG. 1 is a structural diagram of a conventional liquid crystal display unit with dual cell gap. Referring to FIG. 1, the liquid crystal display unit 100 is divided into two areas, a transmissive area T and a reflective area R. In another aspect, the liquid crystal display unit 100 comprises a first substrate 110, a thin-film transistor 120, a dielectric layer 130, a transparent electrode 140, a reflective electrode 150, a liquid crystal layer 160, a spacer 170, a color filter film 180, and a second substrate 190.

As shown in FIG. 1, the thin-film transistor 120 is disposed on the first substrate 110; the dielectric layer 130 is disposed on the thin-film transistor 120 and the first substrate 110; the transparent electrode 140 and the reflective electrode 150 are both disposed on the dielectric layer 130 and are respectively located in transmissive area T and reflective area R; the color filter film 180 is disposed on a bottom surface of the second substrate 190; the liquid crystal layer 160 is disposed between the transparent electrode 140 and the reflective electrode 150 over the first substrate 110 and the color filter film 180; the spacer 170 is disposed on the transparent electrode 140 or the reflective electrode 150 to keep the cell gap of the liquid crystal display unit 100.

It's noted that the cell gap of transmissive area T is twice as the cell gap of reflective area R. In the reflective area R, the light enters the liquid crystal display is reflected out of the liquid crystal display unit 100 by the reflective electrode 150. In the transmissive area T, the light enters the liquid crystal display passes through the liquid crystal display unit 100 directly. The propagating distance of the light in the reflective area R and in the transmissive area T is substantially identical. Thus, the transmittance of the reflective area R is substantially identical to the transmittance of the transmissive area T.

FIG. 2 is a simulative diagram illustrating the transmittance of the liquid crystal display unit with dual cell gap. Referring to FIG. 2, the transmittance of the reflective area R and the transmittance of the transmissive area T are substantially the same under different bias voltages. In other words, the transflective LCDs with dual cell gap have better display quality. However, since the cell gap of the transmissive area T and the cell gap of the reflective area R are different, a taper formed at the join of the transparent electrode 140 and the reflective electrode 150 will cause inconsistent liquid crystal rubbing in certain area or uneven electric field, and which may further cause light leakage in transflective LCDs with dual cell gap. Moreover, the taper formed at the join of the transparent electrode 140 and the reflective electrode 150 will decrease the aperture ratio of transflective LCDs with dual cell gap.

FIG. 3 is a structural diagram of a conventional liquid crystal display unit with single cell gap. Referring to FIG. 3, the liquid crystal display unit 200 is similar to the liquid crystal display unit 100 shown in FIG. 2, the difference is that in the liquid crystal display unit 200, the cell gap of the transmissive area T is substantially identical to the cell gap of the reflective area R. Even though there is no light leakage or aperture ratio decrease problem in transflective LCDs with single cell gap since there is no taper formed between the transparent electrode 240 and the reflective electrode 250, but under the same driving voltage, the display quality of the transflective LCDs with single cell gap is not ideal due to the difference between the transmittance of the reflective area R and the transmittance of the transmissive area T.

FIG. 4 is a simulative diagram illustrating the transmittance of the liquid crystal display unit with single cell gap. Referring to FIG. 4, the transmittance of the reflective area R and the transmittance of the transmissive area T are quite different under the same bias voltage. As described in FIGS. 3 and 4, such liquid crystal display unit 200 with single cell gap cannot manage both the transmittance of the reflective area R and the transmittance of the transmissive area T efficiently.

SUMMARY OF THE INVENTION

The present invention is directed to provide a transflective pixel structure capable of improving display quality.

As embodied and broadly described herein, the present invention provides a transflective pixel structure comprising an active device, a storage capacitor, a transparent electrode, and a first reflective electrode. The storage capacitor comprises a bottom electrode, a floating electrode, and an upper electrode. The upper electrode is disposed above the bottom electrode and the floating electrode, and is electrically connected to the active device. The transparent electrode is electrically connected to the upper electrode. The first reflective electrode is electrically connected to the floating electrode and electrically insulated from the transparent electrode.

In an embodiment of the present invention, the active device comprises a thin-film transistor.

In an embodiment of the present invention, the transparent electrode and the first reflective electrode are arranged in substantially the same plane.

In an embodiment of the present invention, the first reflective electrode is disposed above the storage capacitor.

In an embodiment of the present invention, the transflective pixel structure further comprises a common line disposed between the transparent electrode and the first reflective electrode.

In an embodiment of the present invention, the bottom electrode is electrically connected to the common line.

In an embodiment of the present invention, the upper electrode extends from under the first reflective electrode to above the common line.

In an embodiment of the present invention, the transflective pixel structure further comprises a first dielectric layer, a second dielectric layer, and a planar layer. The first dielectric layer is disposed under the transparent electrode and the first reflective electrode so as to cover the bottom electrode and the floating electrode. The second dielectric layer is disposed on the first dielectric layer so as to cover the upper electrode. The planar layer is disposed on the second dielectric layer, wherein the first dielectric layer, the second dielectric layer, the planar layer have a first contact window, and the transparent electrode and the first reflective electrode are electrically connected to the upper electrode and the floating electrode, respectively, through the first contact window.

In an embodiment of the present invention, the transflective pixel structure further comprises a second reflective electrode electrically connected to the upper electrode.

In an embodiment of the present invention, the transflective pixel structure further comprises a first dielectric layer, a second dielectric layer, and a planar layer. The first dielectric layer is disposed under the transparent electrode, the first reflective electrode, and the second reflective electrode so as to cover the bottom electrode and the floating electrode. The second dielectric layer is disposed on the first dielectric layer so as to cover the upper electrode. The planar layer is disposed on the second dielectric layer, wherein the first dielectric layer, the second dielectric layer, and the planar layer have a first contact window and a second contact window, the transparent electrode and the first reflective electrode are electrically connected to the upper electrode and the floating electrode, respectively, through the first contact window, and the second reflective electrode is electrically connected to the upper electrode through the second contact window.

In an embodiment of the present invention, the area ratio of the second reflective electrode to the first reflective electrode is, for example, between about 0.05 and about 0.4.

In the transflective pixel structure according to exemplary embodiments of the present invention, the transmittance of reflective area is close to the transmittance of transmissive area by adjusting the size of the overlapping area between the upper electrode and the floating electrode, thus the display quality of the transflective LCD panels with single cell gap may be improved.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 5B and 5C are cross-sectional views respectively illustrating the transflective pixel structure in FIG. 5A along line A-A' and line B-B'.

FIGS. 6B and 6C are cross-sectional views respectively illustrating the transflective pixel structure in FIG. 6A along line A-A' and line B-B'.

DESCRIPTION OF EMBODIMENTS

Figure 1:
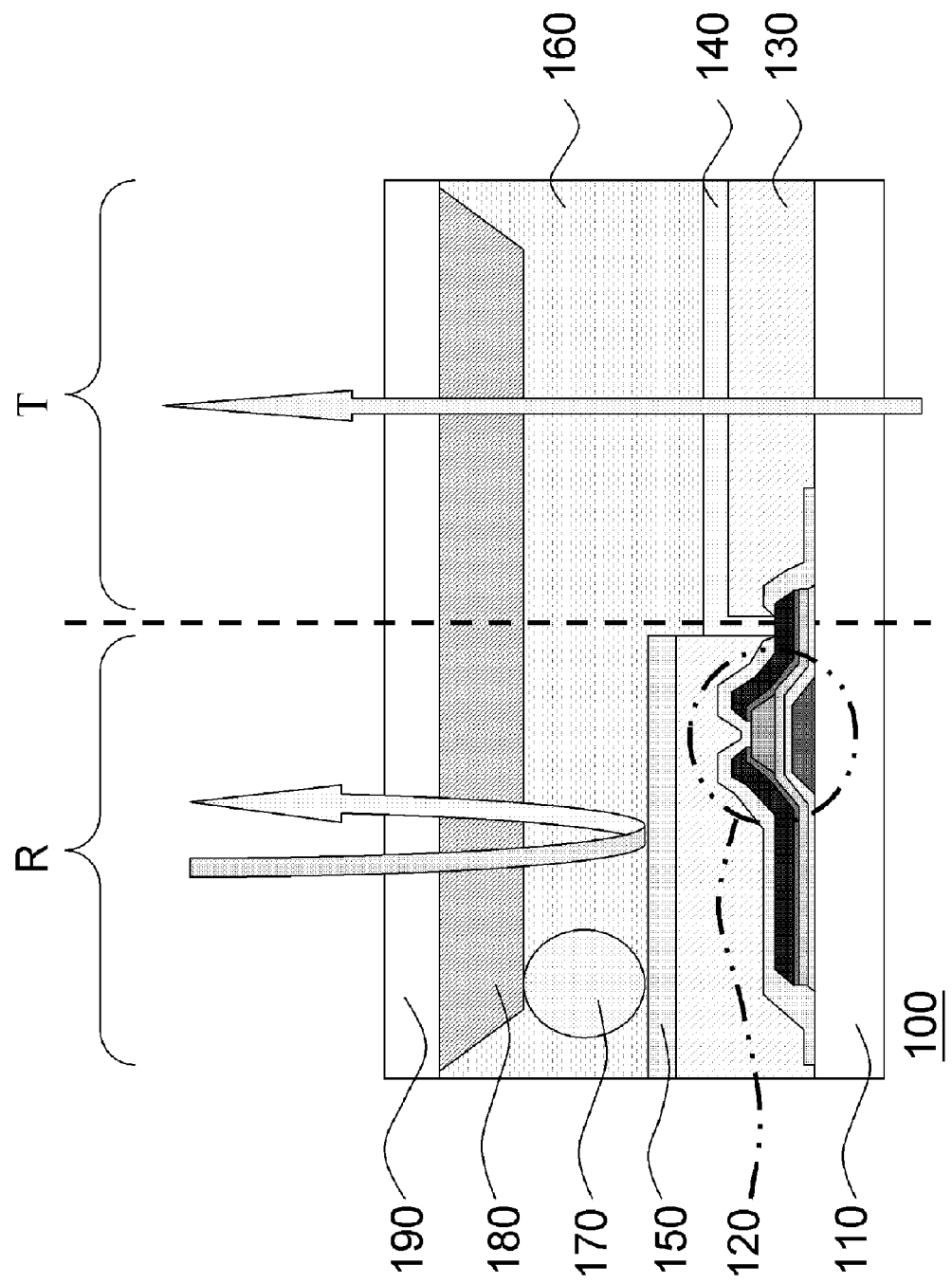
FIG. 1 is a structural diagram of a liquid crystal display unit with dual cell gap.
Figure 2:
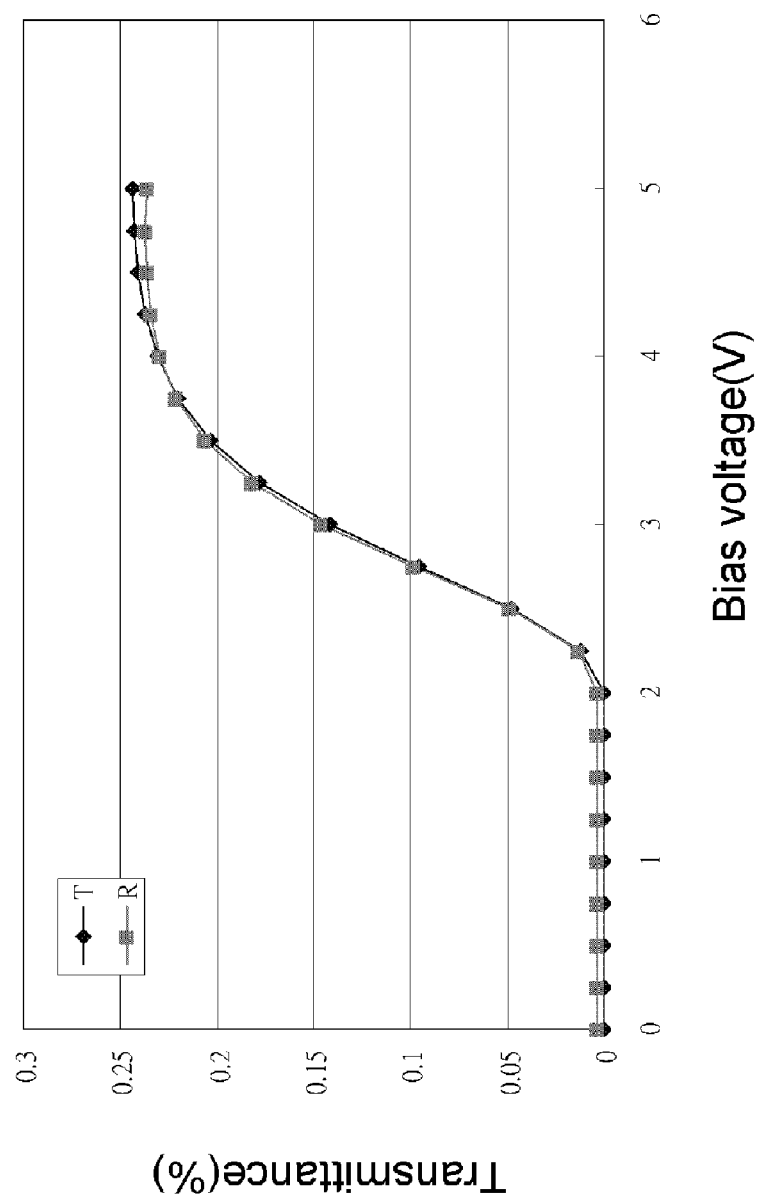
FIG. 2 is a simulative diagram illustrating the transmittance of a liquid crystal display unit with dual cell gap.
Figure 3:
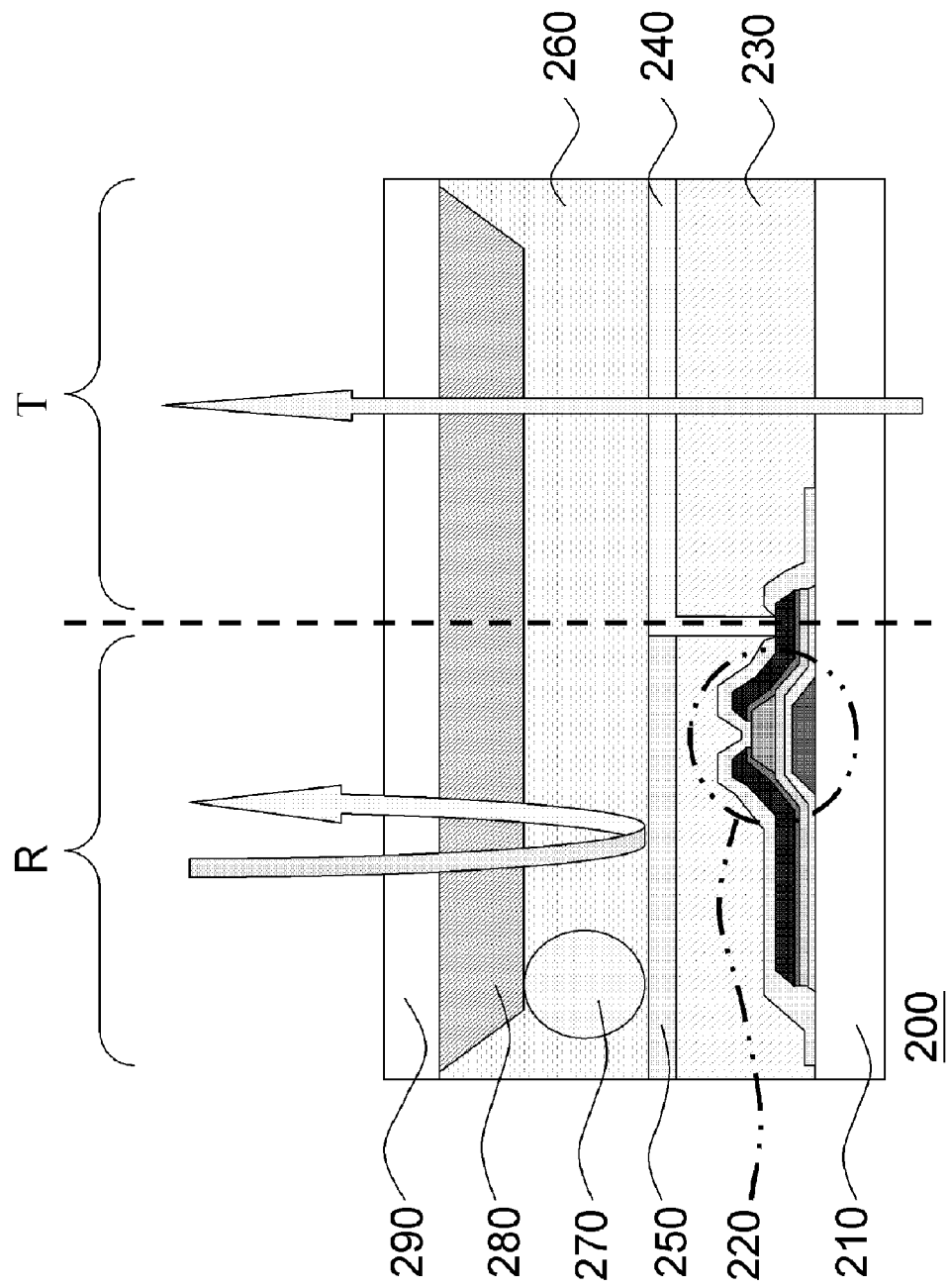
FIG. 3 is a structural diagram of a liquid crystal display unit with single cell gap.
Figure 4:
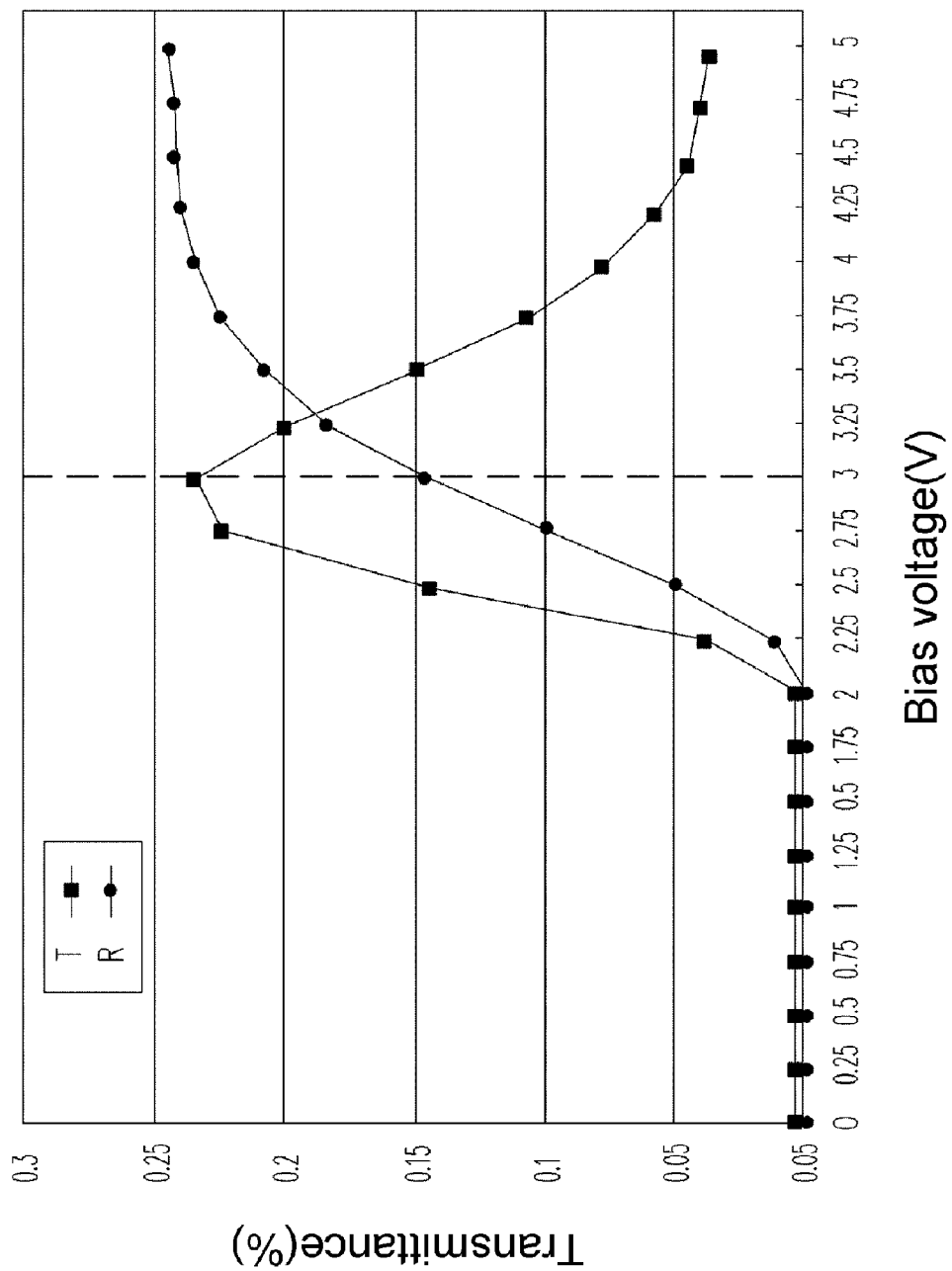
FIG. 4 is a simulative diagram illustrating the transmittance of a liquid crystal display unit with single cell gap.
Figure 5A:
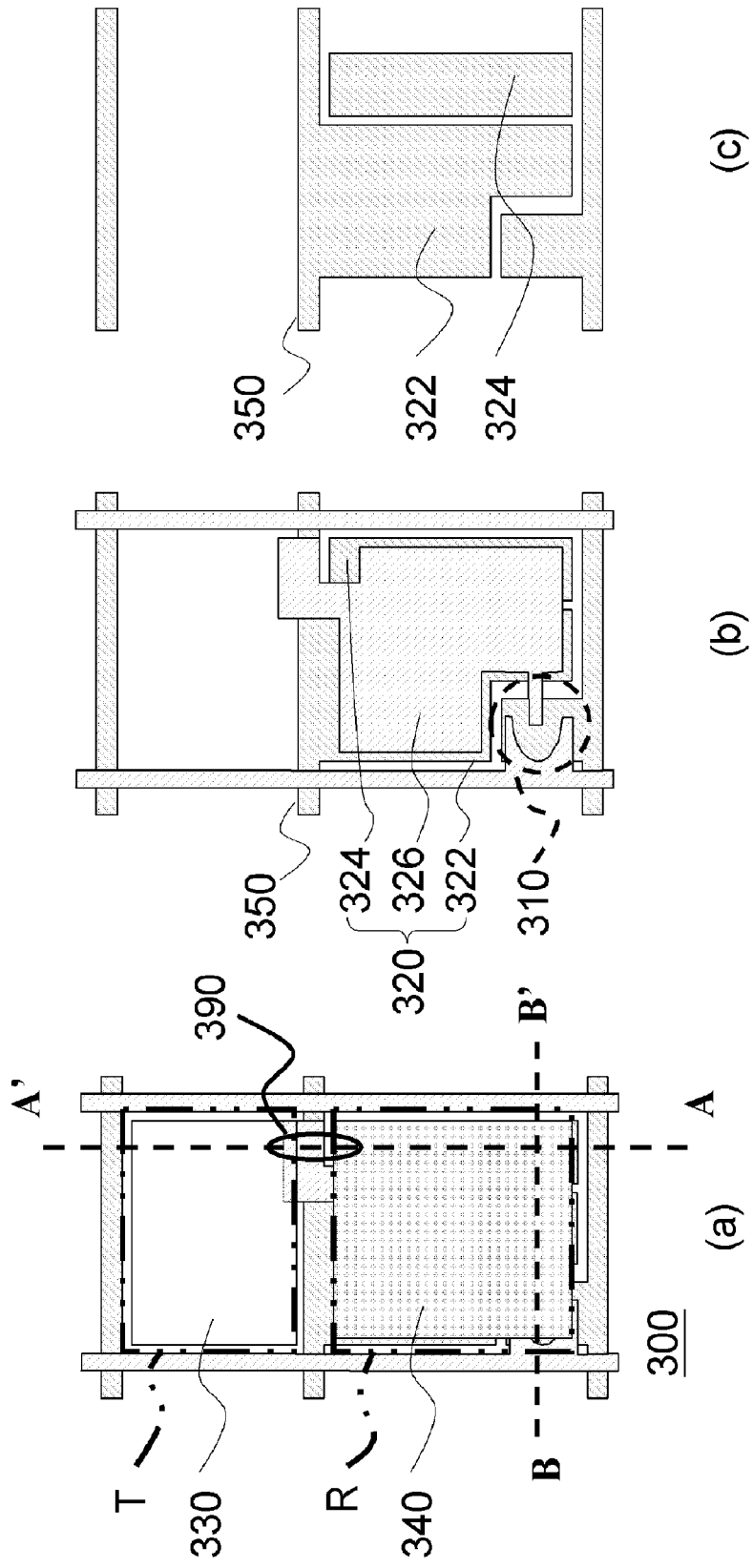
FIG. 5A is a structural diagram illustrating the transflective pixel structure according to the first embodiment of the present invention.

FIG. 5A is a structural diagram illustrating the transflective pixel structure according to the first embodiment of the present invention, wherein portion (a) is a top view of the transflective pixel structure, portion (b) is a top view of the next layer structure of portion (a), and portion (c) is a top view of the next layer structure of portion (b). In addition, FIGS. 5B and 5C are cross-sectional views respectively illustrating the transflective pixel structure in FIG. 5A along line A-A' and line B-B'. Referring to FIG. 5A to 5C. The transflective pixel structure 300 according to the first embodiment of the present invention is located on a first substrate 110, the transflective pixel structure 300 has two areas, a transmissive area T and a reflective area R. The transflective pixel structure 300 comprises an active device 310, a storage capacitor 320, a transparent electrode 330, and a first reflective electrode 340. The storage capacitor 320 comprises a bottom electrode 322, a floating electrode 324, and an upper electrode 326.

The active device 310 may be used as a charge or discharge switch of the transparent electrode 330 and the first reflective electrode 340. The active device 310 comprises a thin-film transistor. The upper electrode 326 is disposed above the bottom electrode 322 and the floating electrode 324, and is electrically connected to the active device 310, the materials thereof is, for example, metal or other suitable conductive materials. The transparent electrode 330 is electrically connected to the upper electrode 326 so that the transparent electrode 330 may be electrically connected to the active device 310 through the upper electrode 326, the materials thereof is, for example, indium tin oxide (ITO), or other transparent conductive materials. The first reflective electrode 340 is disposed above the storage capacitor 320 and is arranged in substantially the same plane as the transparent electrode 330. Further, the first reflective electrode 340 is electrically connected to the floating electrode 324 of the storage capacitor 320, but the first reflective electrode 340 is electrically insulated from the transparent electrode 330, the materials of the first reflective electrode 340 is, for example, metal or other suitable reflective conductive materials.

In addition, a common line 350 is disposed between the transparent electrode 330 and the first reflective electrode 340 and is electrically connected to the bottom electrode 322. The upper electrode 326 extends from under the first reflective electrode 340 to above the common line 350.

Generally, there are dielectric layers disposed in capacitors. In the transflective pixel structure 300 of the present embodiment, a first dielectric layer 360 is disposed in the storage capacitor 320. Specifically, the first dielectric layer 360 is disposed under the transparent electrode 330 and the first reflective electrode 340 so as to cover the bottom electrode 322 and the floating electrode 324. In the capacitor formed by the first reflective electrode 340 and the upper electrode 326, a second dielectric layer 370 and a planar layer 380 is further included. The second dielectric layer 370 is disposed on the first dielectric layer 360 so as to cover the upper electrode 326. Furthermore, the planar layer 380 is disposed on the second dielectric layer 370 such that the first reflective electrode 340 and the transparent electrode 330 are arranged in substantially the same plane. The first dielectric layer 360, the second dielectric layer 370, and the planar layer 380 have a first contact window 390 wherein the transparent electrode 330 and the first reflective electrode 340 can be electrically connected to the upper electrode 326 and the floating electrode 324 respectively through the first contact window 390.

Due to the formation of the planar layer 380, the first reflective electrode 340 and the transparent electrode 330 are arranged in substantially the same plane. Thus, in the transflective pixel structure 300 of the present embodiment, inconsistent liquid crystal rubbing in certain area or uneven electric field problem is prevented, accordingly the light leakage problem of transflective LCDs with single cell gap can be reduced.

Figure 5D:
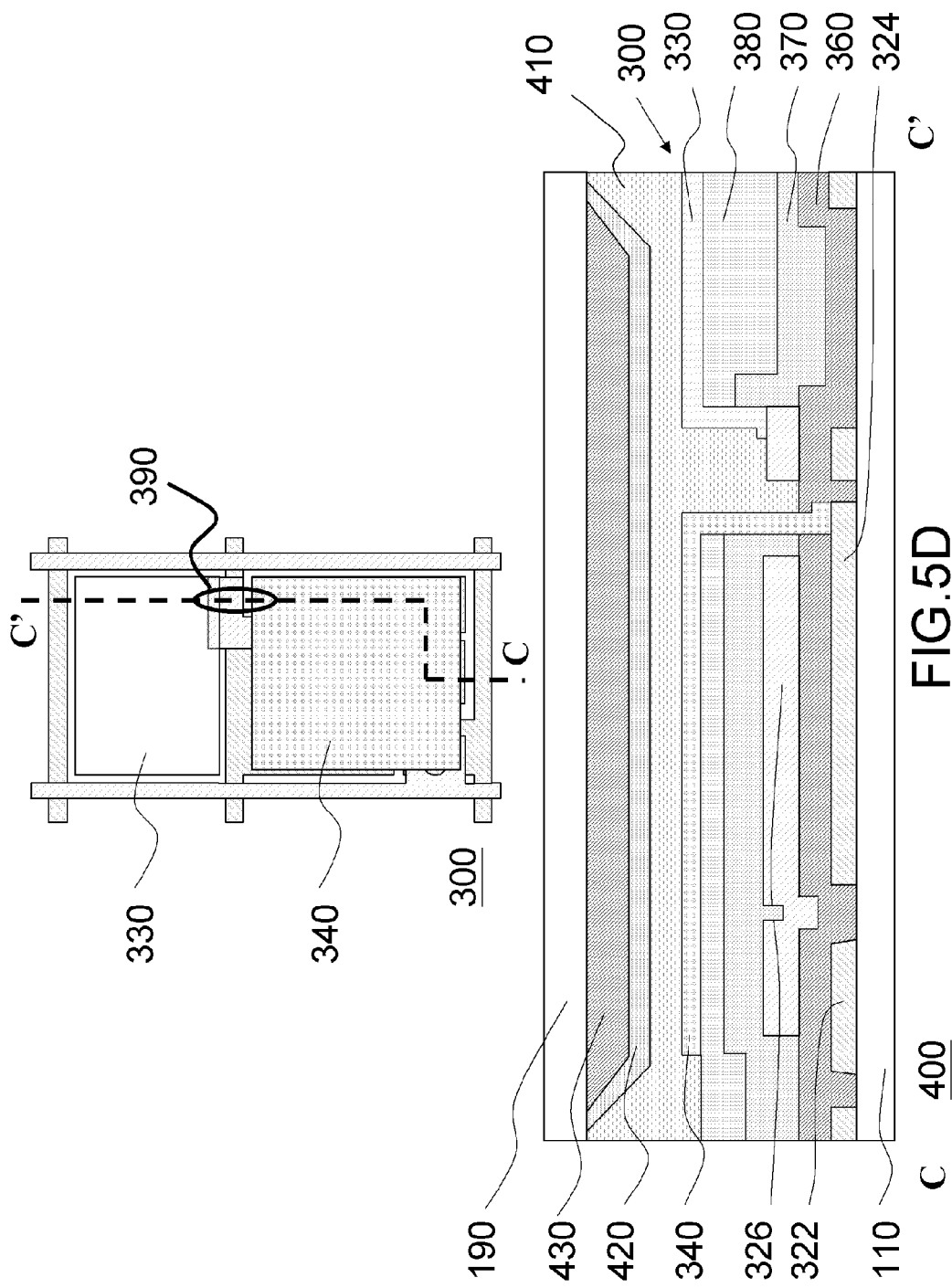
FIG. 5D is a cross-sectional view illustrating a liquid crystal display unit formed by the transflective pixel structure in FIG. 5A along line C-C'.

FIG. 5D is a cross-sectional view illustrating a liquid crystal display unit formed by the transflective pixel structure in FIG. 5A along line C-C'. Referring to FIG. 5D, the liquid crystal display unit 400 comprises a transflective pixel structure 300, a liquid crystal layer 410, a common electrode 420, a color filter film 430, and a second substrate 190. The liquid crystal layer 410 is disposed between the transflective pixel structure 300 and the common electrode 420, while the common electrode 420 is disposed on a bottom surface of the color filter film 430 and the color filter film 430 is disposed on a bottom surface of the second substrate 190.

Figure 5E:
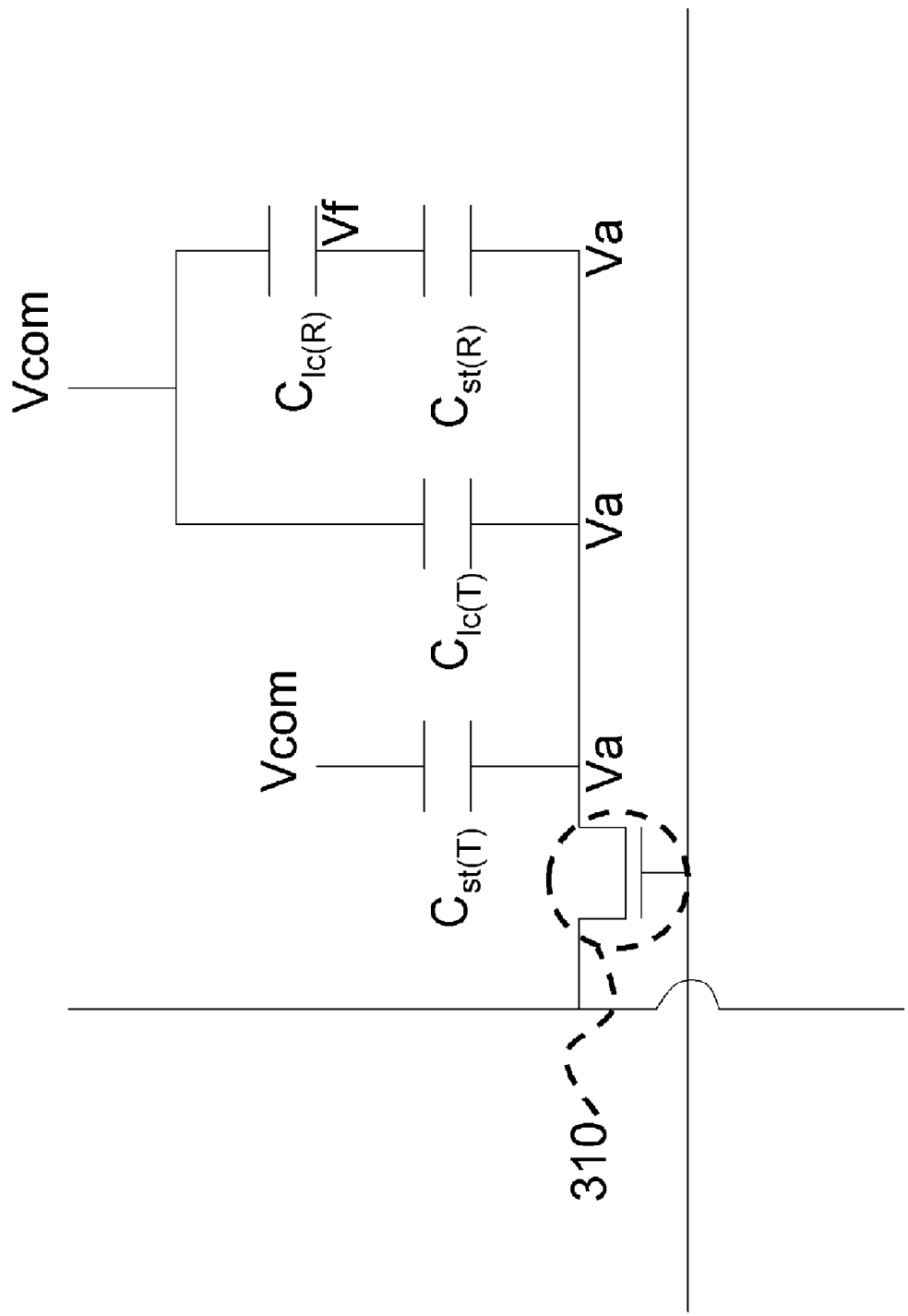
FIG. 5E is an equivalent circuit diagram of the liquid crystal display unit formed by the transflective pixel structure according to the first embodiment of the present invention.

FIG. 5E is an equivalent circuit diagram of the liquid crystal display unit formed by the transflective pixel structure according to the first embodiment of the present invention. Referring to both FIGS. 5D and 5E, the upper electrode 326 (or the transparent electrode 330) in FIG. 5D is the first electrode (the bottom electrode of the capacitor $C_{st(T)}$ in FIG. 5E) and the bottom electrode 322 in FIG. 5D is the second electrode (the upper electrode of the capacitor $C_{st(T)}$ in FIG. 5E) of the capacitor $C_{st(T)}$ in FIG. 5E. The transparent electrode 330 (or upper electrode 326) in FIG. 5D is the first electrode (the bottom electrode of the capacitor $C_{lc(T)}$ in FIG. 5E) and the common electrode 420 in FIG. 5D is the second electrode (the upper electrode of the capacitor $C_{lc(T)}$ in FIG. 5E) of the capacitor $C_{lc(T)}$ in FIG. 5E. The upper electrode 326 in FIG. 5D is the first electrode (the bottom electrode of the capacitor $C_{st(R)}$ in FIG. 5E) and the first reflective electrode 340 (or the floating electrode 324) in FIG. 5D is the second electrode (the upper electrode of the capacitor $C_{st(R)}$ in FIG. 5E) of the capacitor $C_{st(R)}$ in FIG. 5E. The first reflective electrode 340 (or the floating electrode 324) is the first electrode (the bottom electrode of the capacitor $C_{lc(R)}$ in FIG. 5E and the common electrode 420 in FIG. 5D is the second electrode (the upper electrode of the capacitor $C_{lc(R)}$ in FIG. 5E) of the capacitor $C_{lc(R)}$ in FIG. 5E.

Figure 5F:
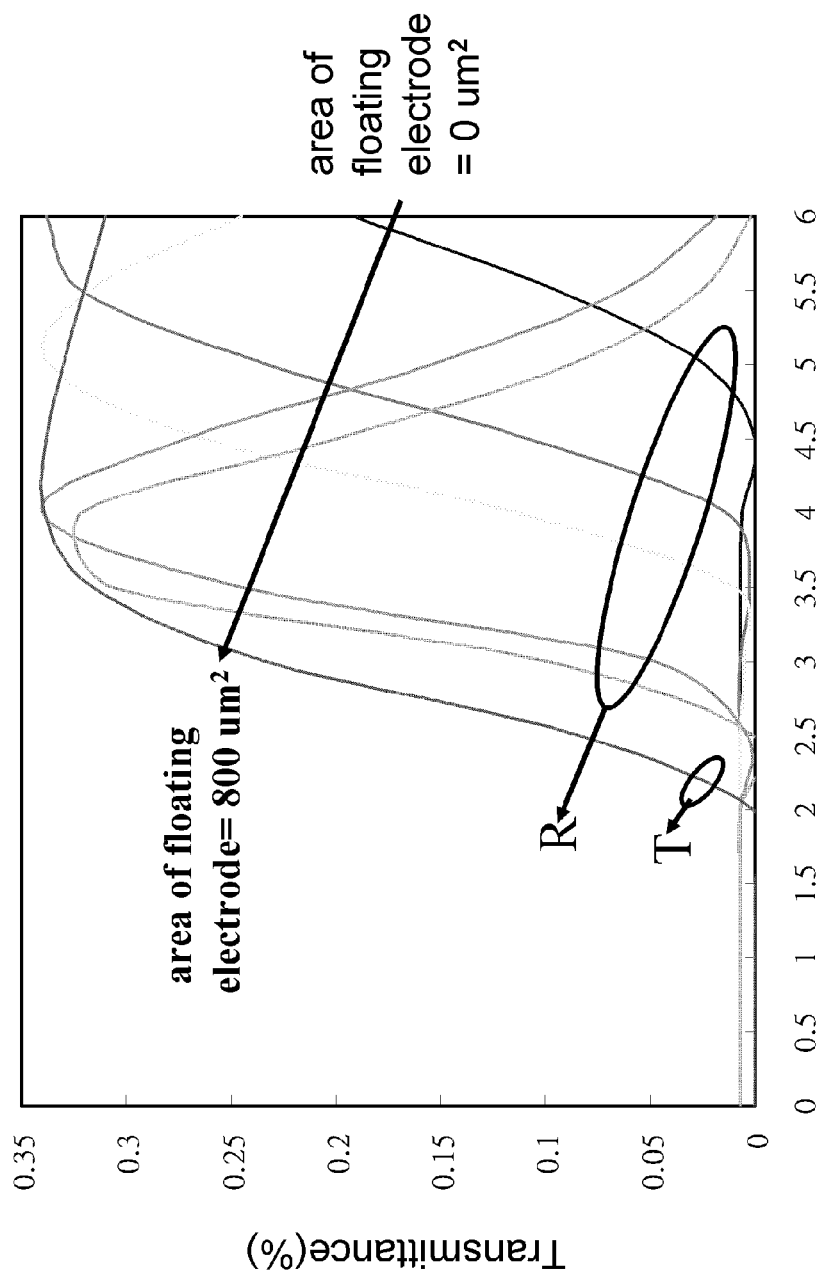
FIG. 5F is a simulative diagram illustrating the transmittance of the liquid crystal display unit formed by the transflective pixel structure according to the first embodiment of the present invention.

Still referring to FIG. 5E, when the active device 310 is turned on, an bias voltage Va can be supplied to the upper electrode 326 so that the voltages of the first electrode of capacitor $C_{st(T)}$ (i.e. upper electrode 326 or transparent electrode 330), the first electrode of capacitor $C_{lc(T)}$ (i.e. transparent electrode 330), and the first electrode of capacitor $C_{st(R)}$ (i.e. upper electrode 326) are all Va. Since capacitor $C_{st(R)}$ and capacitor $C_{lc(R)}$ are electrically connected in series, the voltage difference (Va-Vcom) needs to be allocated on the two capacitors $C_{st(R)}$ and $C_{lc(R)}$. Thus, the voltage Vf of the first electrode of capacitor $C_{lc(R)}$ (i.e. the floating electrode 324 or the first reflective electrode 340) is different from the bias voltage Va. If the degree of the overlapping area between the upper electrode 326 and the floating electrode 324 is changed, the value of $C_{st(R)}$ can be adjusted, that is, the voltage Vf of the first electrode of capacitor $C_{lc(R)}$ (i.e. the floating electrode 324 or the first reflective electrode 340) can be adjusted accordingly. As described above, by changing voltage Vf, it's possible to make the transmittance of reflective area R close to the transmittance of transmissive area T. FIG. 5F is a simulative diagram illustrating the transmittance of the liquid crystal display unit formed by the transflective pixel structure according to the first embodiment of the present invention. Referring to FIG. 5F, it's obvious that under the same bias voltage, the transmittance of reflective area R is close to the transmittance of transmissive area T. Thereby the transflective LCDs with single cell gap formed by the transflective pixel structure 300 according to the present invention have better display quality.

Figure 6A:
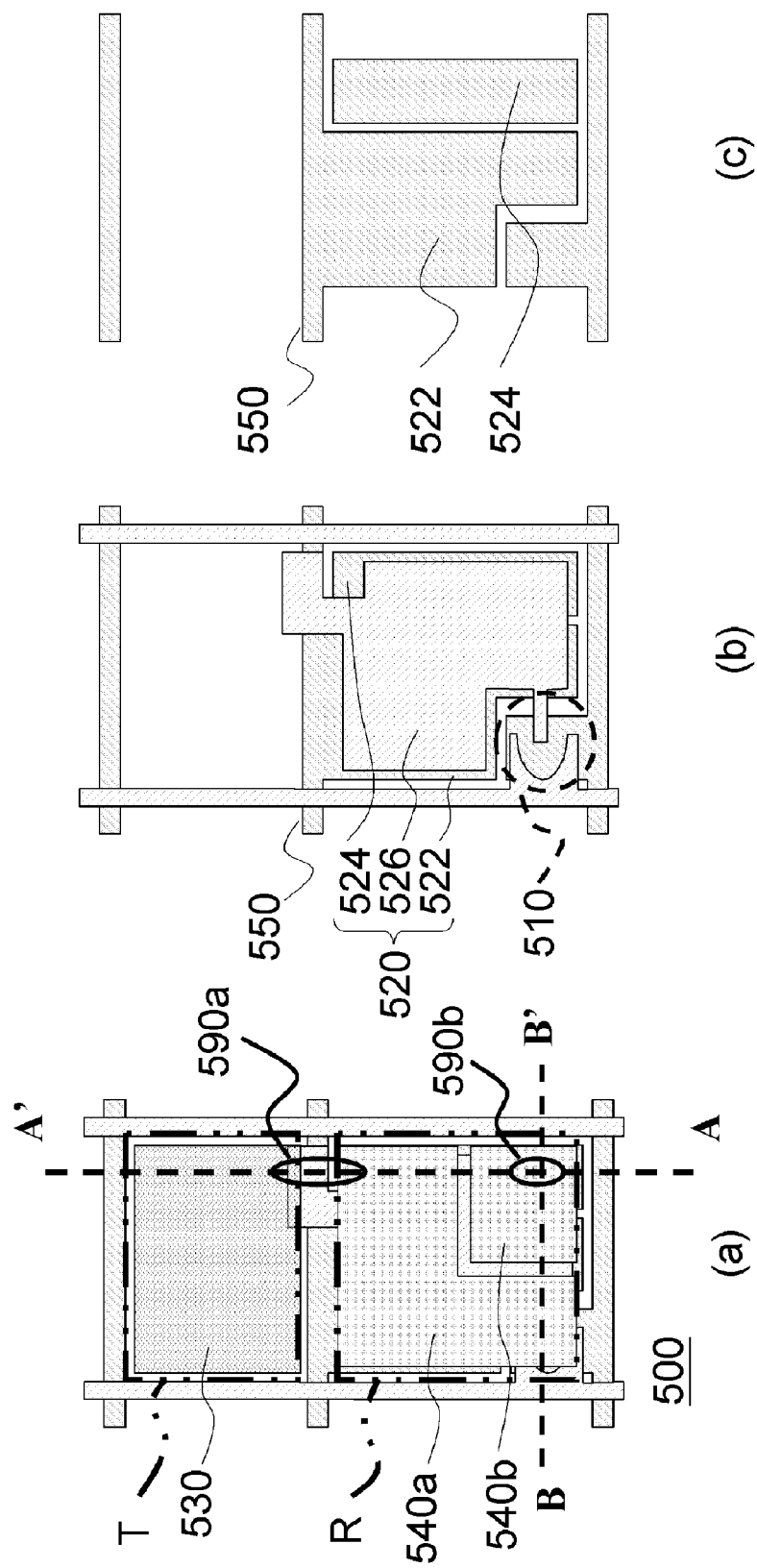
FIG. 6A is a structural diagram illustrating the transflective pixel structure according to the second embodiment of the present invention.

FIG. 6A is a structural diagram illustrating the transflective pixel structure according to the second embodiment of the present invention, wherein portion (a) is a top view of the transflective pixel structure, portion (b) is the top view of the next layer structure of portion (a), and portion (c) is the top view of the next layer structure of portion (b). In addition, FIGS. 6B and 6C are cross-sectional views respectively illustrating the transflective pixel structure in FIG. 6A along line A-A' and line B-B'. Referring to FIG. 6A to 6C. The transflective pixel structure 500 of the present embodiment is similar to the transflective pixel structure 300 of the first embodiment, the difference is that the transflective pixel structure 500 according to the present embodiment comprises a second reflective electrode 540b which is electrically connected to the upper electrode 526 and is electrically insulated from the first reflective electrode 540a, and the area ratio of the second reflective electrode 540b to the first reflective electrode 540a is, for example, between about 0.05 and about 0.4.

In the transflective pixel structure 500 of the present embodiment, a first dielectric layer 560 is disposed in the storage capacitor 520, the first dielectric layer 560 is disposed under the transparent electrode 530, the first reflective electrode 540a, and the second reflective electrode 540b so as to cover the bottom electrode 522 and the floating electrode 524. In the capacitor formed by the first reflective electrode 540a, the second reflective electrode 540b, and the upper electrode 526, a second dielectric layer 570 and a planar layer 580 are further included. The second dielectric layer 570 is disposed on the first dielectric layer 560 so as to cover the upper electrode 526, and the planar layer 580 is disposed on the second dielectric layer 570 such that the first reflective electrode 540a, the second reflective electrode 540b, and the transparent electrode 530 are arranged in substantially the same plane. As shown in FIG. 6A, the first dielectric layer 560, the second dielectric layer 570, and the planar layer 580 have a first contact window 590a and a second contact window 590b. The transparent electrode 530 and the first reflective electrode 540a are electrically connected to the upper electrode 526 and the floating electrode 524 respectively through the first contact window 590a, and the second reflective electrode 540b is electrically connected to the upper electrode 526 through the second contact window 590b.

Figure 6D:
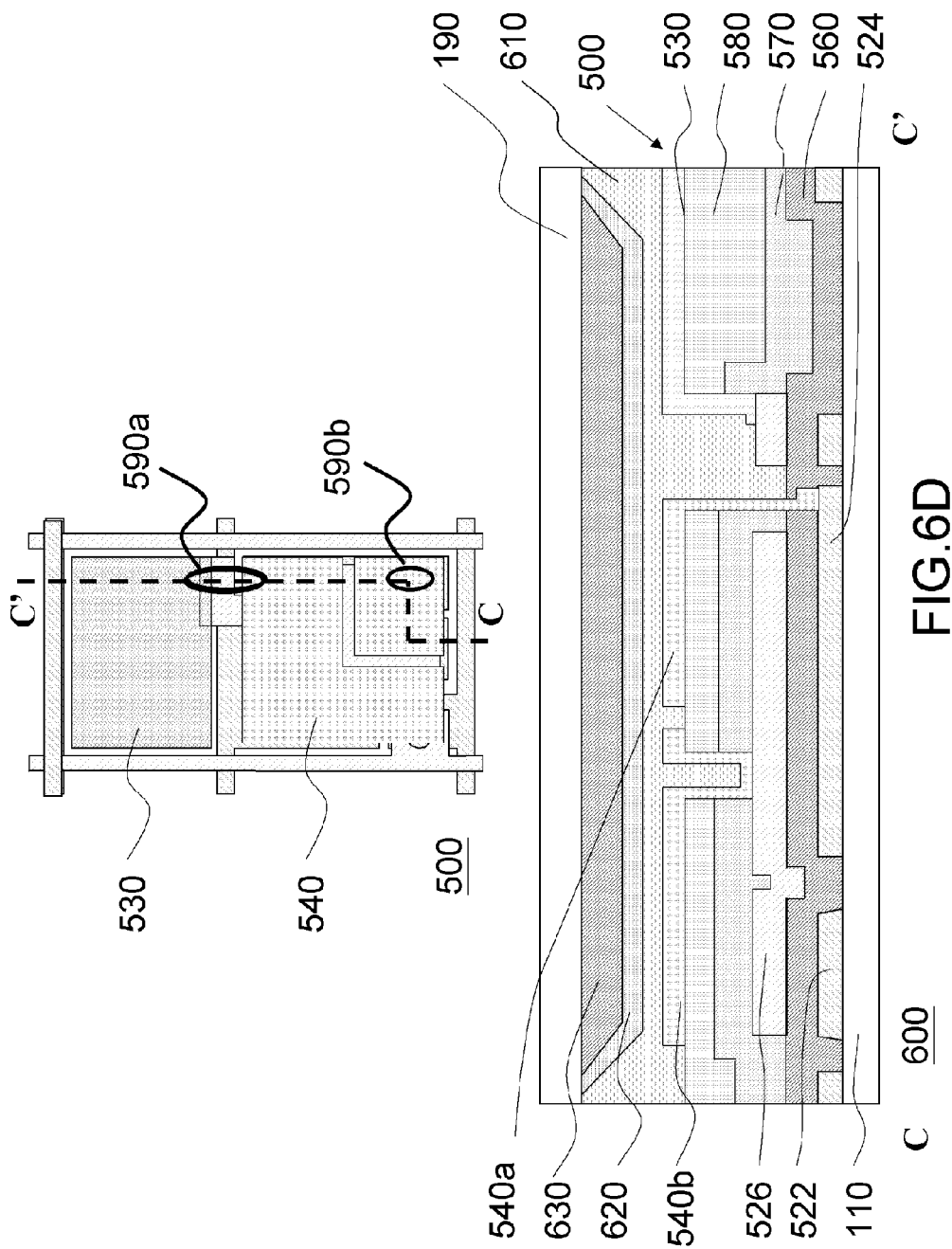
FIG. 6D is a cross-sectional view illustrating the liquid crystal display unit formed by the transflective pixel structure in FIG. 6A along line C-C'.
Figure 6E:
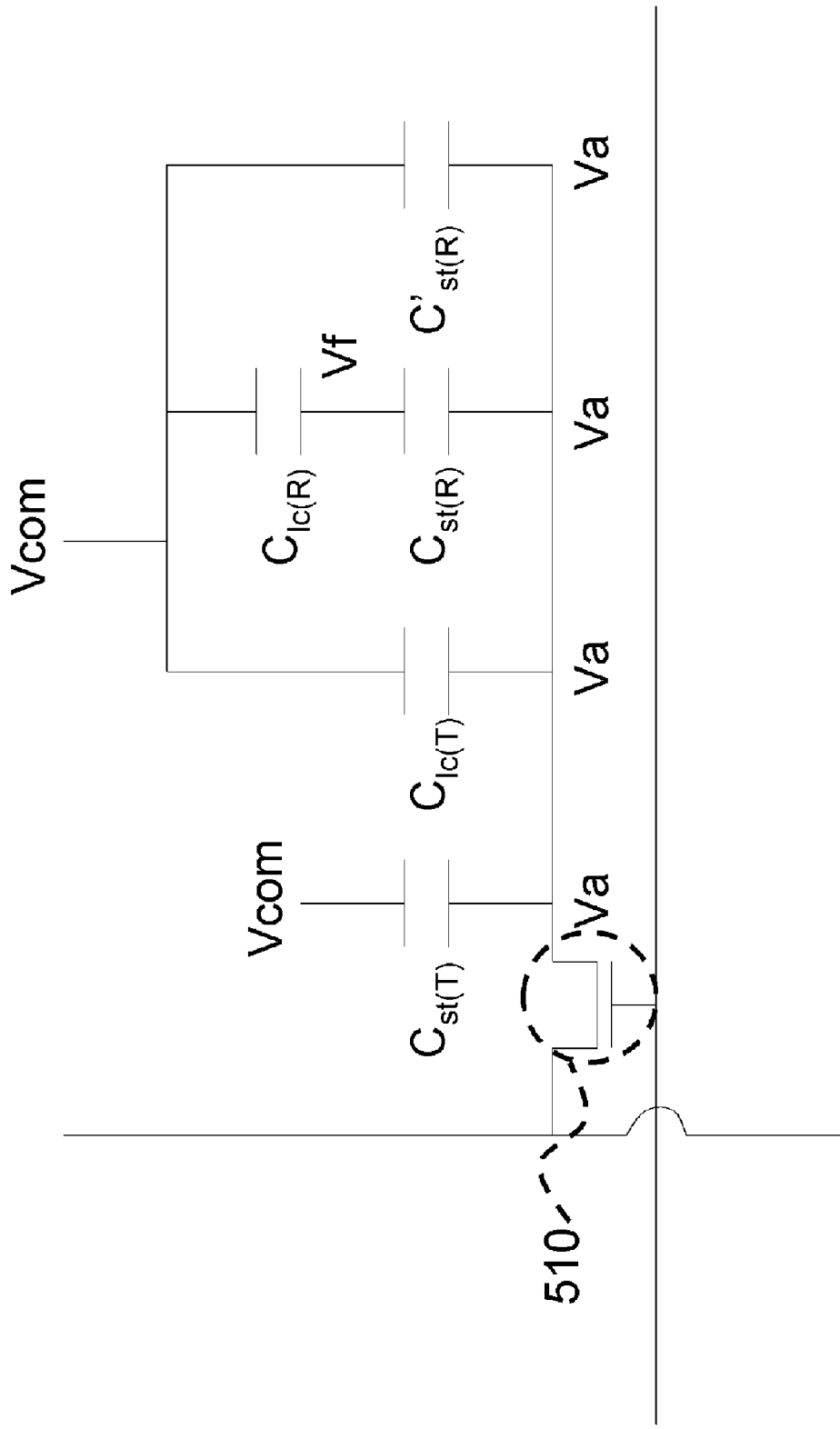
FIG. 6E is an equivalent circuit diagram of the liquid crystal display unit formed by the transflective pixel structure according to the second embodiment of the present invention.

FIG. 6D is a cross-sectional view illustrating the liquid crystal display unit formed by the transflective pixel structure in FIG. 6A along line C-C'. Referring to FIG. 6D, the liquid crystal display unit 600 is similar to the liquid crystal display unit 400. FIG. 6E is an equivalent circuit diagram of the liquid crystal display unit formed by the transflective pixel structure according to the second embodiment of the present invention. Referring to both FIGS. 6D and 6E, the upper electrode 526 (or the transparent electrode 530) in FIG. 6D is the first electrode of capacitor $C_{st(T)}$ in FIG. 6E and the bottom electrode 522 in FIG. 6D is the second electrode of capacitor $C_{st(T)}$ in FIG. 6E. The transparent electrode 530 (or upper electrode 526) in FIG. 6D is the first electrode of capacitor $C_{lc(T)}$ in FIG. 6E and the common electrode 620 in FIG. 6D is the second electrode of capacitor $C_{lc(T)}$ in FIG. 6E. The upper electrode 526 in FIG. 6D is the first electrode of capacitor $C_{st(R)}$ in FIG. 6E and the first reflective electrode 540a (or the floating electrode 524) in FIG. 6D is the second electrode of capacitor $C_{st(R)}$ in FIG. 6E. The first reflective electrode 540a (or floating electrode 524) in FIG. 6D is the first electrode of capacitor $C_{lc(R)}$ in FIG. 6E and the common electrode 620 in FIG. 6D is the second electrode of capacitor $C_{lc(R)}$ in FIG. 6E. The bottom electrode 522 in FIG. 6D is the first electrode of capacitor $C'_{st(R)}$ in FIG. 6E and the second reflective electrode 540b (or upper electrode 526) in FIG. 6D is the second electrode of capacitor $C'_{st(R)}$ in FIG. 6E.

Figure 6F:
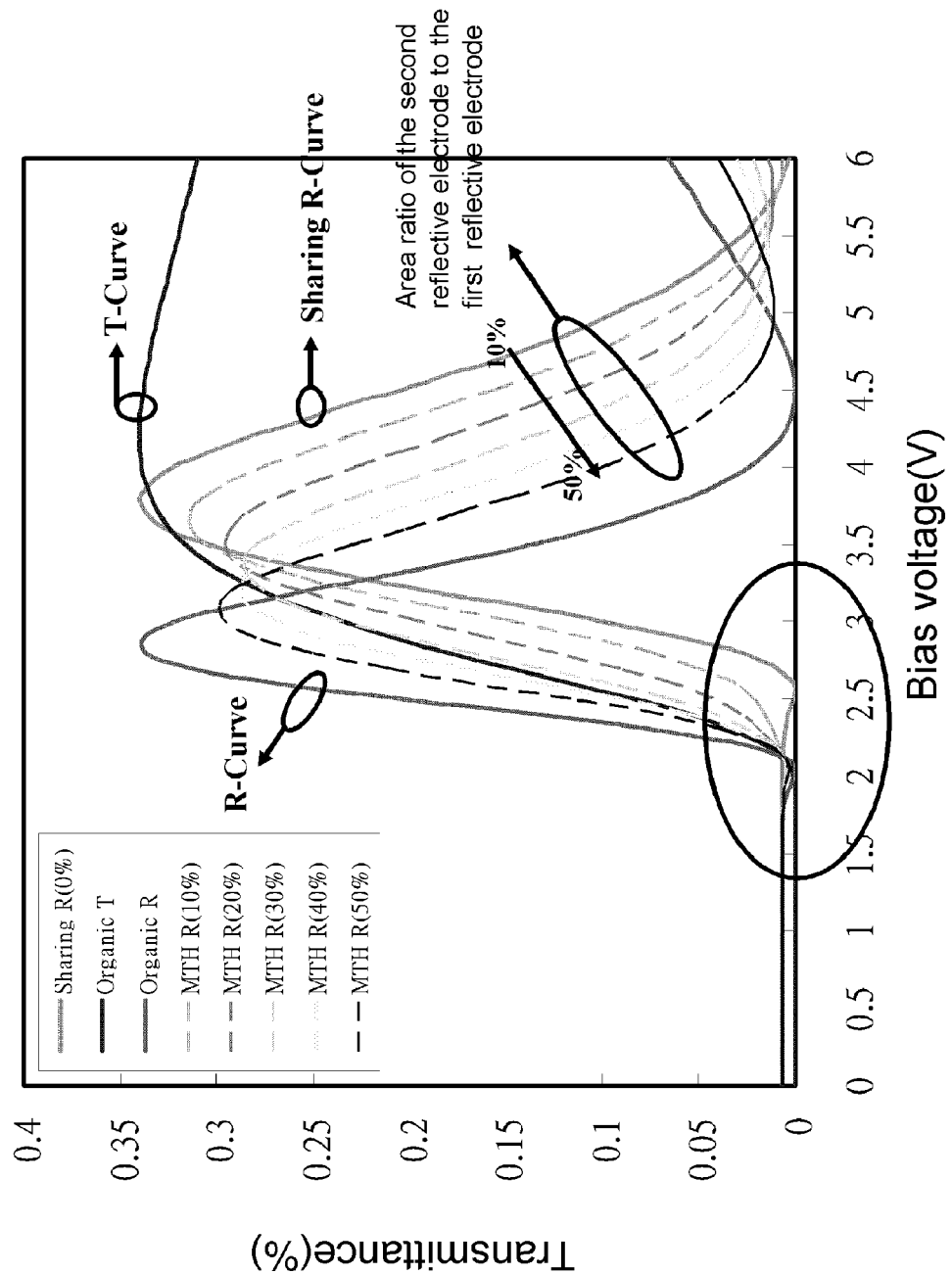
FIG. 6F is a simulative diagram illustrating the transmittance of the liquid crystal display unit formed by the transflective pixel structure according to the second embodiment of the present invention.

Similar to the first embodiment, the value of $C_{st(R)}$ may be adjusted by changing the degree of the overlapping area between the upper electrode 526 and the floating electrode 524, thereby the voltage Vf of the first electrode of capacitor $C_{lc(R)}$ (i.e. the floating electrode 524 or the first reflective electrode 540a) may be adjusted accordingly. The transmittance of the reflective area R may be adjusted to close to the transmittance of the transmissive area T by changing the voltage value Vf. Moreover, due to the formation of the second reflective electrode 540b, the transmittance of the reflective area R may be made even closer to the transmittance of the transmissive area T. FIG. 6F is a simulative diagram illustrating the transmittance of the liquid crystal display unit formed by the transflective pixel structure according to the second embodiment of the present invention. Referring to FIG. 6F, it's obvious that under the same bias voltage, the transmittance of the reflective area R is very close to the transmittance of the transmissive area T. Accordingly, the transflective LCDs with single cell gag made with the transflective pixel structure according to the second embodiment of the present invention have better display quality.

In overview, the transflective pixel structure of the present invention has at least the following advantages:

1. the first reflective electrode and the second reflective electrode of the transflective pixel structure of the present invention are arranged in substantially the same plane as the transparent electrode, so that inconsistent liquid crystal rubbing in certain area or uneven electric field problem can be prevented, and the light leakage problem of transflective LCDs with single cell gap may be reduced.

2. By adjusting the degree of the overlapping area between the upper electrode and the floating electrode, the transflective pixel structure of the present invention makes the transmittance of the reflective area close to the transmittance of the transmissive area, so that the display quality of transflective LCDs with single cell gap may be improved.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

What is claimed is:

1. A transflective pixel structure, comprising:
   an active device;
   a storage capacitor, comprising
   a bottom electrode,
   a floating electrode,
   an upper electrode disposed above the bottom electrode and the floating electrode and electrically connected to the active device;
   a transparent electrode electrically connected to the upper electrode; and
   a first reflective electrode electrically connected to the floating electrode and electrically insulated from the transparent electrode.

2. The transflective pixel structure as claimed in claim 1, wherein the active device comprises a thin-film transistor.

3. The transflective pixel structure as claimed in claim 1, wherein the transparent electrode and the first reflective electrode are arranged in substantially the same plane.

4. The transflective pixel structure as claimed in claim 1, wherein the first reflective electrode is disposed above the storage capacitor.

5. The transflective pixel structure as claimed in claim 1, further comprising a common line disposed between the transparent electrode and the first reflective electrode.

6. The transflective pixel structure as claimed in claim 5, wherein the bottom electrode is electrically connected to the common line.

7. The transflective pixel structure as claimed in claim 5, wherein the upper electrode extends from under the first reflective electrode to above the common line.

8. The transflective pixel structure as claimed in claim 1, further comprising:
   a first dielectric layer disposed under the transparent electrode and the first reflective electrode so as to cover the bottom electrode and the floating electrode;
   a second dielectric layer disposed on the first dielectric layer so as to cover the upper electrode; and
   a planar layer disposed on the second dielectric layer, wherein the first dielectric layer, the second dielectric layer, and the planar layer have a first contact window, the transparent electrode and the first reflective electrode are electrically connected to the upper electrode and the floating electrode, respectively, through the first contact window.

9. The transflective pixel structure as claimed in claim 1, further comprising a second reflective electrode electrically connected to the upper electrode.

10. The transflective pixel structure as claimed in claim 9, further comprising:
    a first dielectric layer disposed under the transparent electrode, the first reflective electrode, and the second reflective electrode so as to cover the bottom electrode and the floating electrode;
    a second dielectric layer disposed on the first dielectric layer so as to cover the upper electrode; and
    a planar layer disposed on the second dielectric layer, wherein the first dielectric layer, the second dielectric layer, and the planar layer have a first contact window and a second contact window, the transparent electrode and the first reflective electrode are electrically connected to the upper electrode and the floating electrode respectively through the first contact window, and the second reflective electrode is electrically connected to the upper electrode through the second contact window.

11. The transflective pixel structure as claimed in claim 9, wherein the area ratio of the second reflective electrode to the first reflective electrode is between about 0.05 and about 0.4.

* * * * *